Patented Nov. 11, 1952

2,617,818

UNITED STATES PATENT OFFICE 2,617,818

THIOCYANOALKYL CARBANILATES

David T. Mowry, Dayton, Ohio, assignor to Monsanto Chemical Company, St. Louis, Mo., a corporation of Delaware No Drawing. Application October 25, 1949, Serial No. 123,526

8 Claims. (Cl. 260—454)

This invention relates to a new class of compounds having unusual effects as herbicides. More particularly the invention relates to compounds having a high degree of selective herbicidal activity.

Selective herbicides are known to the art and extensive applications of these, for example 2,4-dichlorphenoxyacetic acid and derivatives thereof, have been developed. Other herbicides of more general activity are also known and used, but many are not extensively used because of the lack of selective utility. Since weed killers for certain agricultural and lawn applications require activity against broad-leafed weeds and little or no activity against grasses, corn and other grains, and other agriculture uses require total herbicide effect, there has been a substantial need for compounds useful as both general and selective herbicides.

The primary purpose of this invention is to develop a new class of compounds having unusual activity as herbicides. A further purpose of this invention is to develop herbicides having strong activity for all plants at high levels of application, but which also have selective activity at lower levels. Still further purposes of this invention will be apparent from the following description.

The new class of compounds may be represented by the following structural formula:

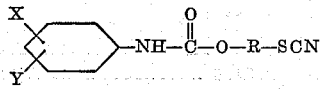

wherein X and Y may be radicals selected from the group consisting of methyl, chlorine or hydrogen, and R is a divalent aliphatic hydrocarbon radical having between two and five carbon atoms.

The new chemical compounds are prepared from haloalkyl carbanilates by reacting them with potassium, sodium, or ammonium thiocyanates, preferably in a polar organic solvent, such as alcohol, actone or dioxane. A preferred procedure is to reflux the reagents in a solvent until the reaction is complete as indicated by complete precipitation of the by-product, alkali halides. The solution is then filtered, and the desired carbanilate recovered by evaporation of the solvent. The required halo-alkyl carbanilates may be prepared by any convenient method, for example by reaction of an N-arylcarbamyl chloride or an aryl isocyanate with a halo-alcohol, or by reaction of a haloalkyl chloroformate and an aromatic amine.

The new thiocyanolakyl esters of carbanilic acid are effective over wide ranges of concentrations. Their effects may be measured by determining the inhibition of root growth as compared to similar untreated plants. In each case, as in the case of all herbicides, there may be some concentrations where inhibition is substantially complete, and other concentrations at which little or no inhibition occurs. In order to have selective activity it is necessary to have a concentration at which substantial inhibition occurs with respect to broad-leafed plants, at which concentration the compound only slightly inhibits the growth of the particular crop to be treated. It has been determined that the selectivity of a herbicide may be measured by comparing the concentrations of a herbicide required to produce a certain inhibition on each broad-leafed and narrow-leafed plant (grasses). For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

Further details of the preparations and uses of the new compounds are set forth with respect to the following specific examples.

*Example 1*

A 3-liter reaction flask provided with a reflux condenser was charged with 2.5 liters of acetone, 220 grams of potassium thiocyanate and 537 grams of β-bromoethyl carbanilate. The solution was refluxed about four hours during which time 236 grams of potassium bromide was precipitated. After filtration the filtrate was concentrated by heating at reduced pressures and mixed with a large excess of water which caused the formation of an oil phase. The aqueous solution was then extracted with chloroform and the chloroform extract combined with the oil phase. The oil was then heated in the presence of additional chloroform and hexane until a slightly turbid solution was obtained. On cooling overnight at 0° C. a substantial yield of white crystalline material was obtained and identified as β-thiocyanoethyl carbanilate.

*Example 2*

Using a procedure similar to that described in the preceding example, except tha various other haloalkyl carbanilates were used, the following thiocyanoalkyl carbanilates were prepared and identified.

β-Thiocyanoethyl 2,5-dichlorocarbanilate
β-Thiocyanoethyl 4-methylcarbanilate
β-Thiocyanoethyl 2-methylcarbanilate
β-Thiocyanoethyl 3-chlorocarbanilate
β-Thiocyanoethyl 2-chlorocarbanilate
β-Thiocyanoethyl 4-chlorocarbanilate
β-Thiocyanoethyl 2,4-dichlorocarbanilate
3-thiocyanopropyl carbanilate
4-thiocyanobutyl carbanilate
1-thiocyano-2-propyl carbanilate

*Example 3*

Seventy-five seeds are placed on filter paper in petri dishes and germinated in the presence of water or dilute aqueous solution of the chemical in the dark at 75° C. The average growth of the primary root is then measured and compared with controls growing in contact with pure water. Isopropyl carbanilate and 2,4-dichlorophenoxyacetic acid (previously known herbicides), and β-thiocyanoethyl carbanilate were tested with both cucumber and wheat seeds and the percentage of growth inhibition measured for various concentrations. The concentration of each compound which permitted twenty percent of normal growth (80 percent inhibition) was determined for each plant with each of the herbicides. The following table sets forth the observed data and the computed ratio of the two concentrations which is a measure of selectivity of the herbicide for cucumbers in comparison with wheat.

| Herbicide | Concentration Required for 80% Inhibition | | |
|---|---|---|---|
| | Cucumber | Wheat | Ratio |
| | P. p. m. | P. p. m. | |
| Isopropyl Carbanilate | 0.23 | 0.3 | 1.5 |
| 2,4-Dichlorophenoxyacetic acid | 0.13 | 12 | 92 |
| β-Thiocyanoethyl Carbanilate | 0.10 | 18 | 185 |

The high degree of selectivity of the thiocyanoethyl ester is important because it enables the use of higher concentrations of herbicides, whereby broad-leafed plants are inhibited to a greater extent with less (or relatively less) of the narrow-leafed crop inhibition.

*Example 4*

The percent of normal growth of cucumber seeds was measured for each of several herbicides at various concentrations. The following table sets forth the observed data.

| Herbicide | Percent growth at parts per million | | | |
|---|---|---|---|---|
| | 100 | 10 | 1 | 0.1 |
| Isopropyl Carbanilate | 7 | 14 | 14 | 32 |
| β-Thiocyanoethyl Carbanilate | 5 | 6 | 8 | 19 |
| β-Thiocyanoethyl 2-Chlorocarbanilate | 7 | 10 | 47 | 94 |
| β-Thiocyanoethyl 3-Chlorocarbanilate | 7 | 7 | 24 | 90 |
| β-Thiocyanoethyl 2-Methylcarbanilate | 4 | 8 | 55 | 75 |
| 1-Thiocyano-2-propyl Carbanilate | 5 | 6 | 15 | 75 |
| 3-Thiocyano-1-propyl Carbanilate | 7 | 8 | 46 | |
| 4-Thiocyano-1-butyl Carbanilate | 7 | 11 | | |

The invention is defined by the following claims.

I claim:

1. A new class of compounds having the following structural formula:

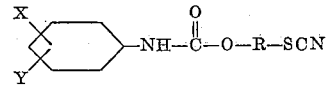

wherein X and Y may be radicals selected from the group consisting of methyl, chlorine and hydrogen, and R is a divalent saturated aliphatic hydrocarbon radical having between two and five carbon atoms.

2. β-Thiocyanoethyl carbanilate.
3. 1-thiocyano-2-propyl carbanilate.
4. β-Thiocyanoethyl 2-methylcarbanilate.
5. A method of preparing thiocyanoalkyl carbanilates, which comprises contacting β-haloalkyl carbanilate and a thiocyanate of the class consisting of alkali metal and ammonium thiocyanates in a non-aqueous solvent, separating the halide salt precipitated, and recovering the thiocyanoalkyl carbanilate.
6. A method of preparing β-thiocyanoethyl carbanilate which comprises contacting β-bromoethyl carbanilate and potassium thiocyanate in an acetone solution, separating the precipitated potassium bromide, evaporating the acetone and recovering the β-thiocyanoethyl carbanilate.
7. A method of preparing 1-thiocyano-2-propyl carbanilate, which comprises contacting β-bromopropyl carbanilate and potassium thiocyanate in an acetone solution, separating the precipitated potassium bromide, evaporating the acetone and recovering the β-thiocyanoethyl carbanilate.
8. A method of preparing β-thiocyanoethyl 2-methylcarbanilate, which comprises contacting β-bromoethyl 2-methylcarbanilate and potassium thiocyanate in an acetone solution, separating the precipitated potassium bromide, evaporating the acetone and recovering the β-thiocyanoethyl carbanilate.

DAVID T. MOWRY.

REFERENCES CITED

The following references are of record in the file of this patent:

UNITED STATES PATENTS

| Number | Name | Date |
|---|---|---|
| 2,239,080 | Coleman et al. | Apr. 22, 1941 |
| 2,467,235 | Searle | Apr. 12, 1949 |

FOREIGN PATENTS

| Number | Country | Date |
|---|---|---|
| 574,995 | Great Britain | Jan. 30 1946 |